(12) United States Patent
Fiebich et al.

(10) Patent No.: US 9,453,594 B2
(45) Date of Patent: Sep. 27, 2016

(54) FIXING DEVICE

(71) Applicant: TRW Automotive Electronics & Components GmbH, Radolfzell (DE)

(72) Inventors: Waldemar Fiebich, Erlenbach (DE); Roland Classen, Monschau (DE)

(73) Assignee: ITW Fastener Products GmbH, Iserlohn (DE)

( * ) Notice: Subject to any disclaimer, the term of this patent is extended or adjusted under 35 U.S.C. 154(b) by 0 days.

(21) Appl. No.: 14/565,490

(22) Filed: Dec. 10, 2014

(65) Prior Publication Data

US 2015/0192226 A1 Jul. 9, 2015

(30) Foreign Application Priority Data

Jan. 7, 2014 (DE) .................. 10 2014 100 073

(51) Int. Cl.
*F16L 3/22* (2006.01)
*F16L 3/237* (2006.01)
*F16L 55/035* (2006.01)
*F16L 3/13* (2006.01)
*F16L 3/223* (2006.01)

(52) U.S. Cl.
CPC .............. *F16L 3/237* (2013.01); *F16L 55/035* (2013.01); *F16L 3/13* (2013.01); *F16L 3/223* (2013.01)

(58) Field of Classification Search
CPC .................................................. F16L 3/2235
USPC ................ 248/68.1, 65, 67.7, 73, 74.1, 74.2
See application file for complete search history.

(56) References Cited

U.S. PATENT DOCUMENTS

| 5,460,342 | A  | * | 10/1995 | Dore et al. ................... 248/74.2 |
| 5,704,573 | A  | * | 1/1998  | de Beers et al. ............... 248/73   |
| 6,152,406 | A  |   | 11/2000 | Denndou                                 |
| 7,328,873 | B2 | * | 2/2008  | Suzuki et al. ............... 248/68.1   |
| 7,614,589 | B2 | * | 11/2009 | Kato ............................. 248/55 |
| 7,658,350 | B2 | * | 2/2010  | Bauer ........................... 248/65  |
| 8,157,223 | B2 | * | 4/2012  | Stau et al. ................... 248/74.2 |
| 2002/0063189 | A1 |   | 5/2002  | Coudrais                             |

(Continued)

FOREIGN PATENT DOCUMENTS

DE  29620300  3/1997
DE  69804054  10/2002

(Continued)

*Primary Examiner* — Terrell McKinnon
*Assistant Examiner* — Michael McDuffie
(74) *Attorney, Agent, or Firm* — Joseph M. Butscher; The Small Patent Law Group, LLC

(57) ABSTRACT

A fixing device for at least one line is provided, with a holding portion for mounting the fixing device and at least one receiving portion which includes a receptacle for at least one line. Between the holding portion and the at least one receiving portion at least one damping portion is provided, which connects the at least one receiving portion with the holding portion and vibrationally decouples the same from the holding portion. The connection between receiving portion and holding portion is formed exclusively by the damping portion. The holding portion consists of a first, hard material and the damping portion of a second, soft material, the receiving portion including at least one damping element protruding into the receptacle, at least one damping component being provided on the outside of the receiving portion at least one damping component, the damping element and the damping portion being integrally connected with each other.

8 Claims, 4 Drawing Sheets

(56) References Cited

U.S. PATENT DOCUMENTS

| | | | |
|---|---|---|---|
| 2003/0010874 A1* | 1/2003 | Nakanishi | 248/68.1 |
| 2004/0188569 A1* | 9/2004 | Bauer | 248/68.1 |
| 2004/0217236 A1* | 11/2004 | Shibuya | 248/68.1 |
| 2006/0186279 A1* | 8/2006 | Kato | 248/68.1 |
| 2006/0273226 A1* | 12/2006 | Jatzke | 248/68.1 |
| 2007/0284485 A1* | 12/2007 | Kato | 248/68.1 |
| 2008/0197241 A1* | 8/2008 | Bauer | 248/68.1 |
| 2013/0146720 A1* | 6/2013 | Meyers et al. | 248/68.1 |

FOREIGN PATENT DOCUMENTS

| | | |
|---|---|---|
| DE | 60117115 | 8/2006 |
| DE | 202008007632 | 9/2008 |
| DE | 102009005421 | 7/2010 |
| EP | 1450089 | 8/2004 |
| EP | 2131084 | 12/2009 |

* cited by examiner

FIXING DEVICE

BACKGROUND OF THE INVENTION

This invention relates to a fixing device for at least one line.

For fixing lines, for exam pie hydraulic lines or brake lines, in vehicles, in particular at the vehicle body, different fixing devices are known from the prior art. Such fixing devices are faced with increasingly higher demands. The fixing devices should ensure a secure hold of the line in the vehicle and protect the line against the shocks and vibrations occurring in the vehicle. Furthermore, however, the fixing devices should be quick and easy to mount and have low manufacturing costs.

SUMMARY OF THE INVENTION

It is the object of the invention to provide a fixing device for at least one line, with provides for a reliable hold and an improved decoupling of the line held in the fixing device from a vehicle body. In addition, easy assembly and manufacture of the fixing device are desired.

In order to achieve this object, there is provided a fixing device for at least one line, with a holding portion for mounting the fixing device and at least one receiving portion which includes a receptacle for at least one line. Between the holding portion and the at least one receiving portion at least one damping portion is provided, which connects the at least one receiving portion with the holding portion and vibrationally decouples the same from the holding portion. The connection between receiving portion and holding portion is formed exclusively by the damping portion. The holding portion consists of a first, hard material and the damping portion of a second, soft material, the receiving portion including at least one damping element protruding into the receptacle, at least one damping component being provided on the outside of the receiving portion at least one damping component, the damping element and the damping portion being integrally connected with each other.

The basic idea underlying the invention is to as far as possible vibrationally decouple the receiving portions, which receive the line(s), from the holding portion, in that between holding portion and receiving portion no direct connection exists which is made of their material. Instead, a separate component namely the damping portion, is used to connect the two components holding portion and receiving portion with each other. The soft material of the damping portion can effectively attenuate vibrations or shocks which are transmitted from the vehicle body to the holding portion, so that the same are kept away from the receiving portion. Except for this damping portion no further connection exists between the holding portion and the receiving portion, via which a transmission of vibrations to the receiving portion would be possible. Thus, an effective decoupling of the receiving portion from the vehicle body is possible, so that the loads caused by vibrations or shocks on the line can be reduced effectively. As the line does not rest against the hard supporting element, but against a softer damping element which is supported by the supporting element on the outside, so to speak, an additional decoupling or damping possibility is created for the line in addition to the damping portion. So that even if vibrations are transmitted to the supporting element, they do not act on the line. With this damping component, the receiving portion for example rests against the vehicle body or another component, whereby an additional supporting function is provided for the receiving portion. Since the damping component preferably is made of the second, soft material and thus can yield flexibly, a vibrational decoupling of the receiving portion from the vehicle body also is effected with such supporting function. It is also conceivable that in the mounted condition this damping component does not constantly rest against the vehicle body, but is able to cushion shocks which can act on the fixing device, in particular on the receiving portion.

The receiving portion for example can include at least one supporting element which at least partly encloses the receptacle, wherein the supporting element in particular is made of a hard material, in particular of the first, hard material. This ensures a reliable hold of the line in the receiving portion or in the receptacle, as due to the supporting element the receiving portion is more stable and thus more able to fix the line.

The damping element at least partly covers the supporting element towards the receptacle. This improves the decoupling effect.

The damping element for example can include at least one damping rib extending radially to the inside, which can yield resiliently. The line can rest against these damping ribs and be moved in the receptacle to a limited extent, in order to attenuate or cushion movements of the receiving portion.

The damping element, the damping portion and/or the damping component each can be formed by separate components, so that an arbitrary arrangement at the receiving portion or at the holding portion is possible. To simplify the manufacture of the fixing device and increase its stability, the damping component is preferably integrally connected to the damping element and the damping portion. The same thus form a common component which is attached to the holding portion and in which the receptacle for the line is provided at least in part. Since this component is made of a soft plastic material, there can be no transmission of vibrations between damping element, damping portion and/or damping component, so that the line is reliably decoupled from the holding portion or from the vehicle body.

The fixing device preferably is manufactured by a two-component injection molding method. In a first manufacturing step, the holding portion and the supporting element and thus also parts of the receiving portion are manufactured from the first, hard material. Subsequently, the second, soft material is injection-molded, which forms the remaining part of the receiving portion, the damping portion as well as possibly the damping component and the at least one damping element, and connects the receiving portion with the holding portion.

At the supporting element and at the holding portion cutouts or undercuts can be provided, into which the second, soft material penetrates, so that a stable connection of the two materials is ensured.

BRIEF DESCRIPTION OF THE DRAWINGS

Further advantages and features can be taken from the following description in conjunction with the attached drawings, in which.

DESCRIPTION OF EMBODIMENTS

Figure 1A:
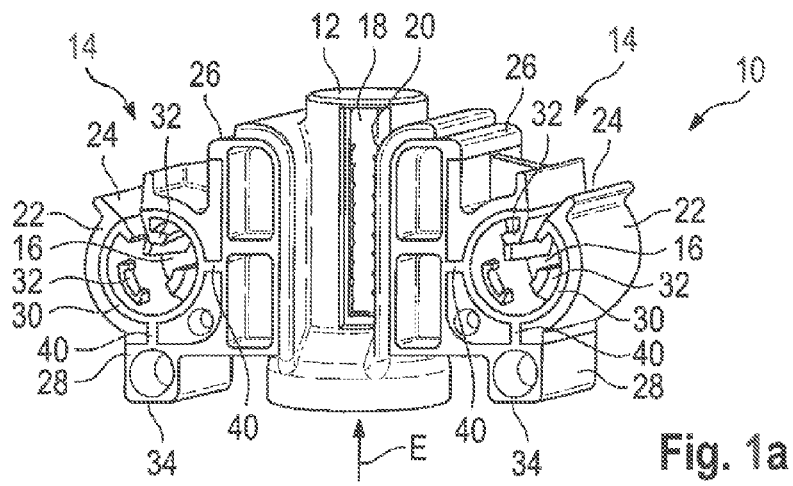
FIGS. 1a to 1c show a perspective view, a front view and a sectional view of a fixing device according to the invention, wherein the sectional plane extends through the center of the fixing device and parallel to the drawing plane of the representation of FIG. 1b, FIGS. 2a to 2c show a perspective view, a front view as well as a sectional view of the holding portion and the supporting elements of the fixing devices of FIGS. 1a to 1c, FIGS. 3a to 3c show a perspective view, a front view as well as a sectional view of the damping elements, the damping portions and the damping components of the fixing device of FIGS. 1a to 1c.
Figure 1B:
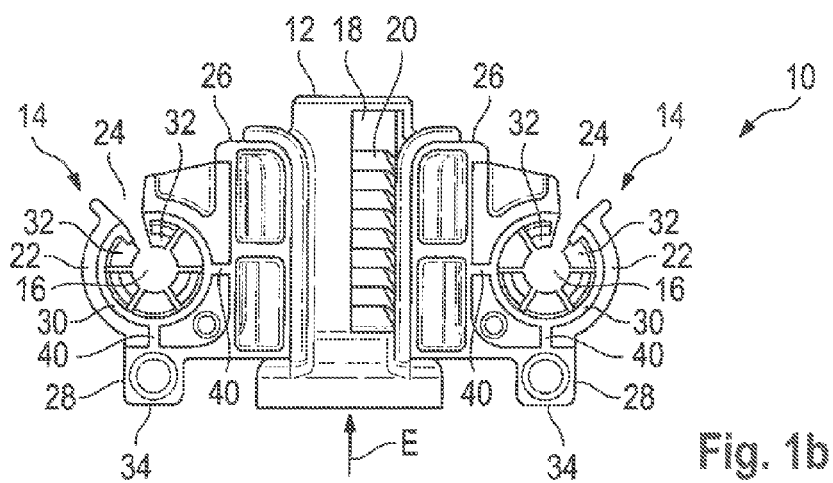
Figure 1C:
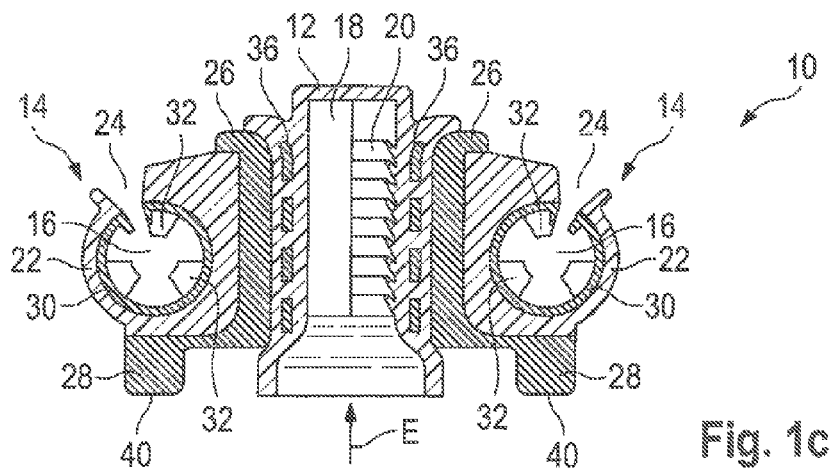

FIGS. 1a to 1c show a fixing device 10 for a line, for example a hydraulic line or a brake line in a vehicle. The fixing device 10 has a holding portion 12 and two receiving portions 14 arranged on opposite sides of the holding portion 12, which each include a substantially cylindrical receptacle for one line each.

With the holding portion 12, the fixing device 10 for example can be attached to a vehicle body. For this purpose, the holding portion 12 has a receiving bore 18 into which a vehicle-fixed bolt can be inserted in an insertion direction E. Alternatively, the holding portion 12 can be pushed onto a bolt firmly mounted at the vehicle.

On the inside of the receiving bore 18 a holding structure 20, for example a latching or a thread, is provided, in order to anchor the fixing device 10 at the vehicle-fixed bolt. To ensure a reliable hold and to ensure the stability of the fixing device 10, the holding portion 12 is made of a first, hard material, preferably of a plastic material.

The receiving portions 14 are arranged on opposite sides of the holding portion 12 in circumferential direction, wherein in the illustrated embodiment both receptacles 16 have the same orientation. The inserted lines thus are held parallel to each other in the region of the receptacles 16. Independent thereof, the receiving portions 1$ and the receptacles can arbitrarily be arranged relative to the holding portion and in particular can have various orientations.

The receiving portions 14 each include a supporting element 22, which likewise is made of a hard material, preferably the same material as the holding portion 12. The supporting element 22 is formed substantially cylindrical and includes an insertion gap 24 which is arranged in longitudinal direction of the receptacle 16. The supporting element 22 each completely encloses the receptacle 16 in circumferential direction except for the insertion gap 24. Via this insertion gap 24, a line can be inserted into the receptacle 16. For this purpose, the supporting element 22 can be bent up elastically, so that the insertion gap 24 is widened.

Between the receiving portions 14 and the holding portion 12 there is each provided a damping portion 26 of a second, soft material preferably of a soft plastic material, which can yield elastically.

As is shown in particular in FIGS. 1a to 1c, the damping portion 26 each connects the receiving portion 14 with the holding portion 12. As can be seen in particular in FIGS. 2a to 2c, there is no direct connection between the hard supporting elements 22 and the holding portion 12. The same is effected exclusively via the damping portion 26 of the second, soft material. This soft material can effectively attenuate vibrations or shocks which act from the vehicle body on the fixing device 10 via the holding portion 12, so that the same are not passed on to the receiving portions 14 or only to a greatly reduced extent. Since apart from the soft damping portions 26 no further connection exists between the receiving portions 14 and the holding portion 12, an effective vibrational decoupling of the receiving portions 14 from the holding portion 12 thus is effected.

Furthermore, to each receiving portion 14 a damping component 28 and a damping element 30 are associated, which, as will be explained below, are integrally made with the damping portion of the second, soft material (see in particular FIGS. 3a to 3c).

The damping components 28 each are provided on the outside of the receiving portions 14 and the supporting elements 22, wherein a damping component 28 is associated to each receptacle. In the embodiment shown here, the opening of the receiving bore 18 and the contact surfaces 34 of the damping components 28 lie in one plane, so that with mounted fixing device 10 the damping components 28 rest against the surface of the vehicle body.

The receiving portions 14 thus are additionally supported and stabilized by the damping components 28. Since the damping components 28 are made of the second, soft material, shocks or vibrations cannot be passed on by the same to the receiving portions 14.

Depending on the position and the shape of the damping components 28, it is however also possible that the same do not permanently rest against the vehicle body, but only in the case of major shocks or impacts prevent the receiving portions 14 from striking against the vehicle body.

The damping elements 30 each cover the supporting element 22 on the inside, wherein the insertion gap 24 is kept free. In addition, the damping element 30 includes damping ribs 32 extending radially to the inside, which can yield elastically, so that the receptacle 16 can be adapted to the diameter of the line. A line inserted into the receptacle 16 thus does not rest against the supporting element 22, but only against the damping element 30. By this damping element 30, in particular by the damping ribs 32 which are made of the second, soft material, a further decoupling of the line inserted into the receptacle 16 from the supporting element 22 furthermore is effected.

By the damping portions 26, the damping components 28 and the damping elements 30, the receiving portions 14 or the supporting elements 22 thus are securely held, but decoupled completely from the holding portion 12 and the vehicle body, so that vibrations which act on the holding portion or the vehicle body can be attenuated reliably.

The fixing device 10 according to the invention preferably is manufactured by a two-component injection molding method, whereby a fast manufacture is ensured and the individual portions are reliably connected with each other.

In a first manufacturing step, the components of the first, hard material, i.e. the holding portion 12 and the supporting elements 22, are manufactured.

Subsequently, the injection mold is filled with the second, soft material, whereby the damping portion 26, the damping components 28 and the damping elements 30 are formed.

Figure 2A:
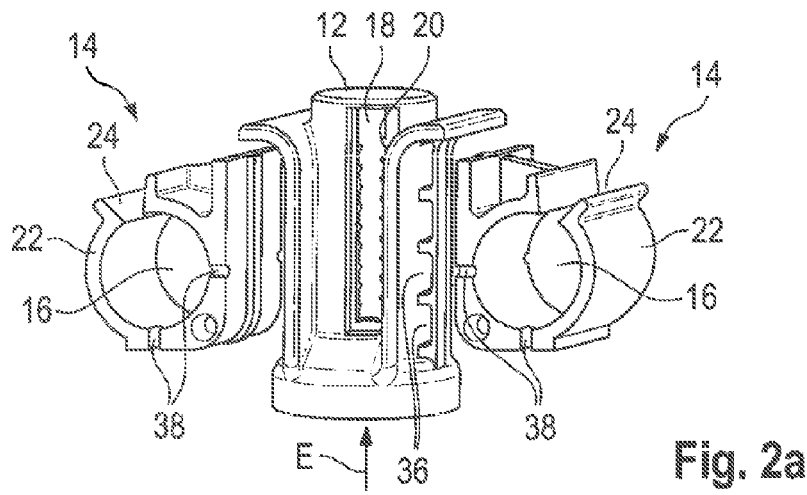
Figure 2B:
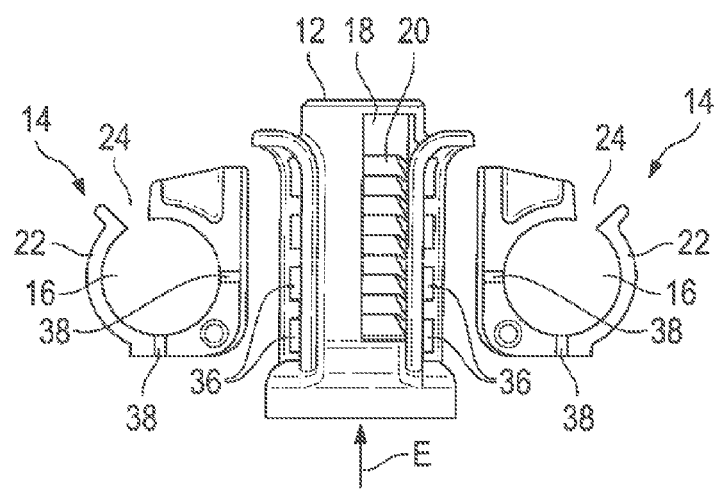
Figure 2C:
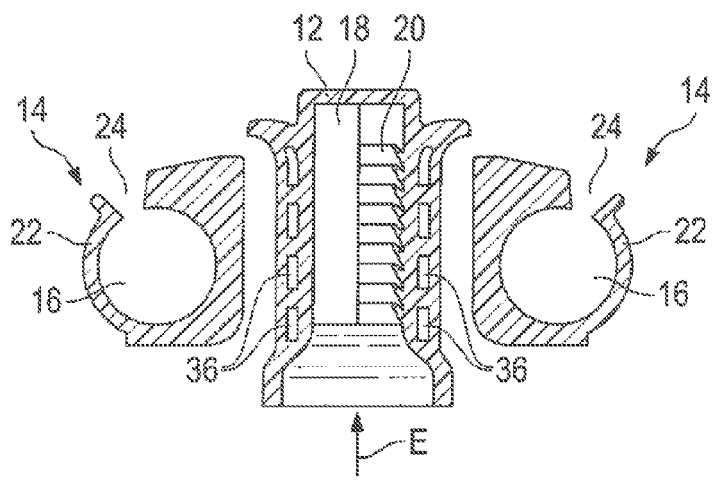

As can be seen in FIGS. 2a to 2c, cutouts 36 and structures 38 are provided at the holding portion and at the supporting elements 22, into which the second, soft material can flow during this manufacturing step. This also ensures a good mechanical connection between the two materials.

Figure 3A:
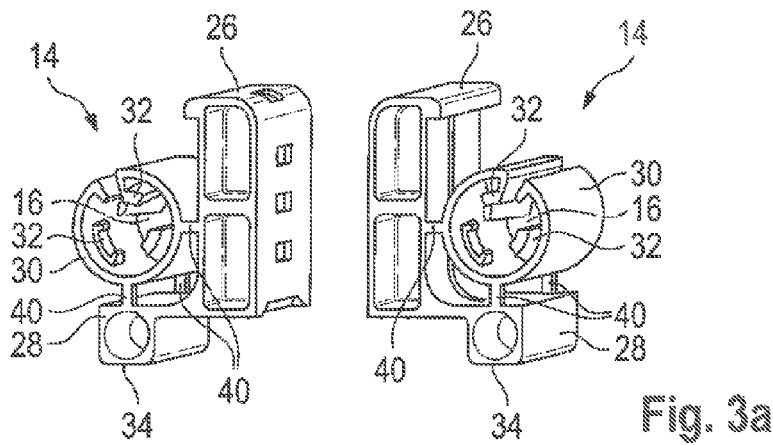
Figure 3B:
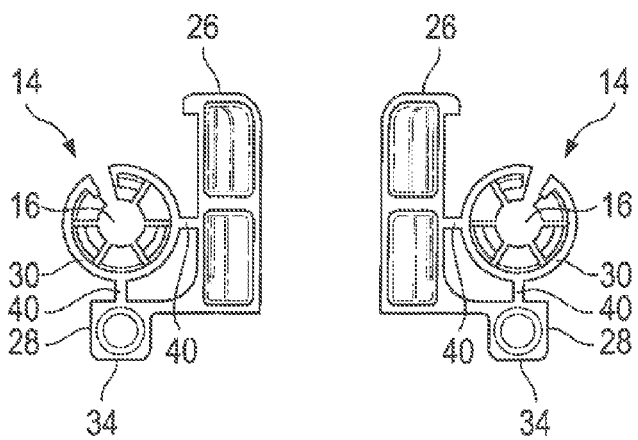
Figure 3C:
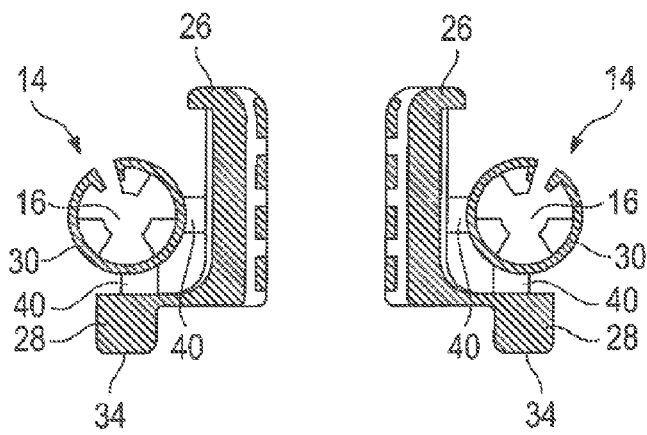

As can be seen in FIGS. 3a to 3c, the damping portions 26, the damping components 28 and the damping elements 30 are connected with each other via webs 40, i.e. integrally connected with each other. In connection with the structures 38 and cutouts 36, into which the second, soft material extends, a reliable connection of all components of the fixing device 10 thereby is ensured.

Figure 4:
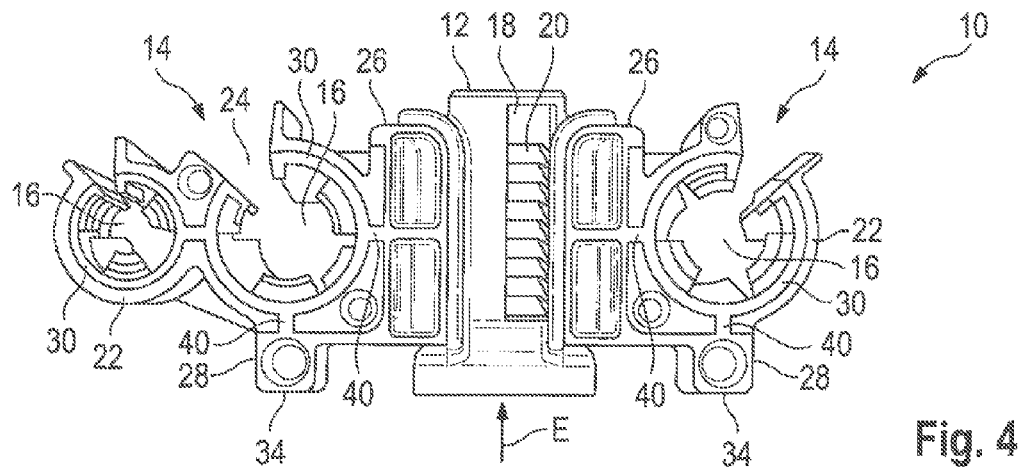
FIG. 4 shows a front view through a second embodiment of a fixing device according to the invention.
Figure 5:
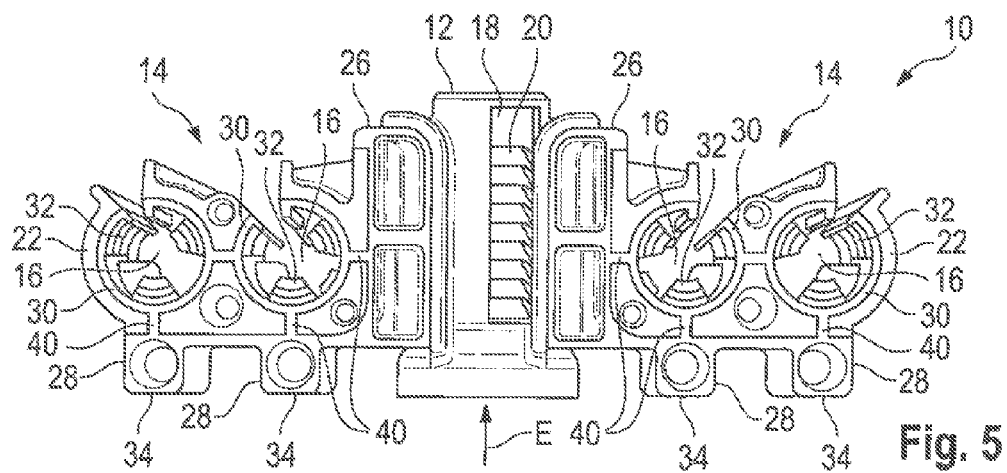
FIG. 5 shows a front view of a third embodiment of a fixing device according to the invention.
Figure 6:
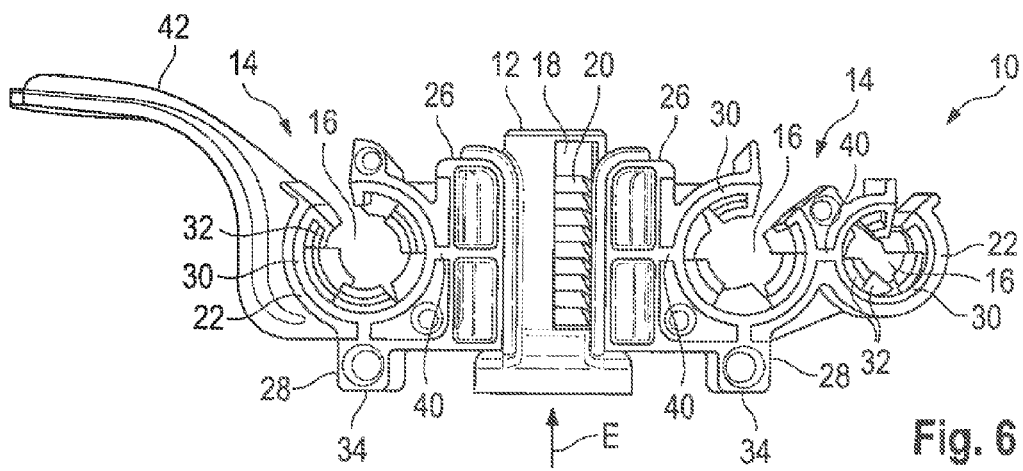
FIG. 6 shows a front view of a fourth embodiment of a fixing device according to the invention.

Further embodiments for fixing devices 10 according to the invention are shown in FIGS. 4 to 6.

The embodiment shown in FIG. 4 substantially corresponds to the embodiment shown in FIGS. 1a to 1c. It merely differs in that on one receiving portion 14 two receptacles 16 are provided for one line each. This receiving portion 14 in addition has a common supporting element 22 for both receptacles 16. It is, however, also conceivable that two separate supporting elements 22 are used, which are connected by a further portion of the second, soft material.

Each receptacle 16 furthermore includes a damping element 30 with damping ribs 32. To each receiving portion 14 only one damping component 28 is associated.

The damping portions 26, damping components 28 and damping elements 30 associated to a receiving portion 14 are integrally connected with each other also in this embodiment, wherein the receiving portions 14 are completely decoupled from the holding portion 12 by the respective damping portion 26.

In FIG. 5, each receiving portion 14 includes two receptacles 16, wherein the construction of the receiving portions 14 each corresponds to the receiving portion of FIG. 4, which includes two receptacles 16.

In this embodiment, a separate damping component 28 furthermore is associated to each receptacle 16.

The embodiment shown in FIG. 6 substantially corresponds to the fixing device 10 shown in FIG. 4, wherein at a supporting element a lever 42 additionally is provided, with which easier bending up of the supporting element 22 for easier removal of the line from the receptacle 16 is possible.

In all embodiments shown the receiving portions are made both of the soft material and of the hard material. The receptacle is formed by a combination of the supporting element 22 with the damping element 30.

But since a complete vibrational decoupling of the receiving portion already is effected by the damping portion 28, it is also possible that the receiving portion 14 only consists of the first, hard material. Alternatively, it is also conceivable to omit a supporting element 22, if the of material has a sufficient stability. In particular, the receiving portion 14 also can be made of a third material, which for example is softer than the first material, but harder than the second.

The damping portions 26, the damping components 28 and the damping elements 30 also can be manufactured separate from each other or have no connection with each other.

The invention claimed is:

1. A fixing device for at least one line, with a holding portion for mounting the fixing device, at least one receiving portion which includes a receptacle for the at least one line, wherein between the holding portion and the at least one receiving portion at least one damping portion is provided, which connects the at least one receiving portion with the holding portion and vibrationally decouples the same from the holding portion, wherein the connection between the receiving portion and the holding portion exclusively is formed by the damping portion, and wherein the holding portion is made of a first, hard material and the damping portion is made of a second, soft material, wherein the at least one receiving portion includes at least one supporting element which at least partly encloses the receptacle, wherein the supporting element is made of the first, hard material, the receiving portion including at least one damping element protruding into the receptacle, at least one damping component being provided on the outside of the receiving portion, wherein the damping element and the damping component are made out of the second, soft material; the at least one damping component, the damping element and the damping portion being integrally connected with each other, wherein the receiving portions are completely decoupled from the holding portion by the respective damping portion.

2. The fixing device of claim 1 wherein the at least one supporting element fully encloses the receptacle in a circumferential direction except for an insertion gap.

3. The fixing device of claim 1 wherein the damping element at least partly covers the supporting element towards the receptacle.

4. The fixing device of claim 1 wherein the damping element includes at least one damping rib extending radially to the inside.

5. The fixing device of claim 1, wherein the hard material of the at least one supporting element is free from a direct connection with the hard material of the holding portion.

6. The fixing device of claim 1, wherein the at least one damping component is located on the same side as the receiving end of the holding portion.

7. A fixing device for holding a line, comprising: a holding portion made of a first material for mounting the fixing device; a receiving portion including a receptacle for receiving the line, the receiving portion being separate and discrete from the holding portion; a damping component provided on an outside of the receiving portion; a damping portion made of a second material the second material being softer than the drat material, the damping portion vibrationally decoupling the holding portion from the receiving portion, the holding portion being connected to the receiving portion only by the damping portion; and a damping element protruding into the receptacle and being integrally connected with the damping component and the damping portion, wherein at least one of cutouts and structures are provided at least one of the holding portion and the supporting elements, the material of at least one of the damping element the damping portion, and the damping component extending into at least one of the cutouts and the structures.

8. The fixing device of claim 7, wherein the receiving portion includes a supporting element that at least partly encloses the receptacle, the supporting element being made of the first material.

* * * * *